US010036599B1

(12) United States Patent
Strehlow et al.

(10) Patent No.: US 10,036,599 B1
(45) Date of Patent: Jul. 31, 2018

(54) THERMAL ENERGY STORAGE ASSEMBLY

(71) Applicant: Minco Products, Inc., Minneapolis, MN (US)

(72) Inventors: Russell H. Strehlow, St. Paul, MN (US); Peter M. Bobgan, Maple Grove, MN (US)

(73) Assignee: Minco Products, Inc., Minneapolis, MN (US)

( * ) Notice: Subject to any disclaimer, the term of this patent is extended or adjusted under 35 U.S.C. 154(b) by 0 days.

(21) Appl. No.: 15/614,882

(22) Filed: Jun. 6, 2017

Related U.S. Application Data

(63) Continuation-in-part of application No. 15/029,421, filed as application No. PCT/US2015/030119 on May 11, 2015, now Pat. No. 9,671,174.

(60) Provisional application No. 61/991,008, filed on May 9, 2014.

(51) Int. Cl.
| | | |
|---|---|---|
| F28D 15/00 | (2006.01) | |
| F28D 20/02 | (2006.01) | |
| F28F 21/08 | (2006.01) | |
| F28D 20/00 | (2006.01) | |
| F28D 21/00 | (2006.01) | |

(52) U.S. Cl.
CPC ......... *F28D 20/026* (2013.01); *F28D 20/023* (2013.01); *F28F 21/084* (2013.01); *F28F 21/085* (2013.01); *F28D 2020/0069* (2013.01); *F28D 2021/0028* (2013.01); *F28F 2275/065* (2013.01)

(58) Field of Classification Search
CPC ...... F28D 15/04; F28D 15/02; F28D 15/0233; F28D 15/0283

USPC ................. 165/80.4, 104.19, 104.21, 104.33
See application file for complete search history.

(56) References Cited

U.S. PATENT DOCUMENTS

| | | | |
|---|---|---|---|
| 3,680,189 A | 8/1972 | Noren | |
| 5,216,580 A | 6/1993 | Davidson et al. | |
| 6,446,706 B1 * | 9/2002 | Rosenfeld | F28D 15/0241 165/104.26 |

(Continued)

FOREIGN PATENT DOCUMENTS

JP 2001241870 A 9/2001

OTHER PUBLICATIONS

International Search Report and Written Opinion written by Blaine Copenheaver dated Aug. 10, 2015 in re PCT/US2015/030119 (9 pages).

*Primary Examiner* — Claire Rojohn, III
(74) *Attorney, Agent, or Firm* — Dicke, Billig & Czaja, PLLC

(57) ABSTRACT

A thermal energy storage assembly characterized by a housing having first and second chambers characterized by first and second phase-change media, respectively, is generally provided. The housing includes first and second housing portions and a partition structure, the housing portions and the partition structure united about their peripheries via an ultrasonic weldment so as to delimit the housing chambers. The second housing chamber includes condenser and evaporator chamber portions or segments. The partition structure and the second housing portion are selectively united via ultrasonic weldment in furtherance of forming tensioning elements within same. A wicking structure and spacing element reside within the second housing chamber to aid phase-change of the second phase change media.

33 Claims, 4 Drawing Sheets

(56) References Cited

U.S. PATENT DOCUMENTS

| | | | | |
|---|---|---|---|---|
| 6,665,180 B2* | 12/2003 | Lehman | .................... | G06F 1/20 |
| | | | | 165/104.33 |
| 7,278,469 B2* | 10/2007 | Sasaki | ................ | F28D 15/0241 |
| | | | | 165/104.26 |
| 7,843,695 B2* | 11/2010 | Yang | .................. | F28D 15/0233 |
| | | | | 165/104.33 |
| 7,995,344 B2 | 8/2011 | Dando, III et al. | | |
| 8,074,706 B2* | 12/2011 | Su | ...................... | F28D 15/0233 |
| | | | | 165/104.26 |
| 8,335,083 B2 | 12/2012 | Yang et al. | | |
| 8,997,839 B2* | 4/2015 | Yang | .................... | F28D 15/046 |
| | | | | 165/104.19 |
| 9,021,698 B2* | 5/2015 | Yang | .................... | B21D 53/02 |
| | | | | 165/104.26 |
| 2003/0159806 A1* | 8/2003 | Sehmbey | ............ | F28D 15/0233 |
| | | | | 165/80.3 |
| 2003/0210527 A1 | 11/2003 | Saite et al. | | |
| 2006/0124280 A1* | 6/2006 | Lee | .................... | F28D 15/0233 |
| | | | | 165/104.26 |
| 2008/0210407 A1* | 9/2008 | Kim | .................... | F28D 15/0233 |
| | | | | 165/104.26 |
| 2010/0294461 A1* | 11/2010 | Weaver, Jr. | ........... | F28D 15/046 |
| | | | | 165/80.2 |
| 2011/0017431 A1* | 1/2011 | Yang | .................... | F28D 15/046 |
| | | | | 165/104.26 |
| 2011/0048672 A1* | 3/2011 | Martin | ...................... | F28F 3/12 |
| | | | | 165/46 |
| 2011/0108245 A1* | 5/2011 | Tan | ........................ | F28D 15/04 |
| | | | | 165/104.26 |
| 2011/0120674 A1* | 5/2011 | MacDonald | .......... | F28D 15/046 |
| | | | | 165/104.26 |
| 2011/0186268 A1 | 8/2011 | Yang et al. | | |
| 2013/0327504 A1* | 12/2013 | Bozorgi | ................. | F28D 15/04 |
| | | | | 165/104.26 |

* cited by examiner

THERMAL ENERGY STORAGE ASSEMBLY

This is a continuation-in-part filed under 35 USC § 111(a) and 37 CFR § 1.53(b) claiming priority under 35 USC § 120 of/to U.S. patent application Ser. No. 15/029,421 filed Apr. 14, 2016 and entitled THERMAL GROUND PLANE, the disclosure of which is hereby incorporated by reference in its entirety.

TECHNICAL FIELD

The present disclosure is generally directed to thermal energy storage assembly, more particularly to one or more of thermal energy storage devices, subassemblies, and/or structures, methods of thermal energy management, and methods of fabricating such planes and/or structures.

BACKGROUND

Power generating electronic and optical devices/systems, as well as energy conversion and storage systems such as fuel cells and the like, have become increasingly compact. At stake has been and is thermal energy management performance, and thus, the reliability of such devices and systems. Increasingly and currently, it is generally believed that improved thermal energy management is requisite to advance such high performance electronic, optical and energy conversion/storage devices and/or systems.

Heat pipes, thermal ground planes and vapor chambers (a/k/a flat heat pipes) are frequently employed for the above noted thermal energy management. Characteristically, such devices combine principles of both thermal conductivity and phase transition to effectively manage a transfer of heat between two solid interfaces. More particularly, such passive heat transfer devices utilize capillary forces to circulate a working fluid between discrete evaporator and condenser regions of a vacuum tight housing, compartment, shell or vessel.

With regard to such devices, a working fluid occupies a vapor chamber having evaporating and condensing portions. In heat spreading applications, heat enters at a select surface location (i.e., area) and exits across the rest of the surfaces. In heat transport applications, a discrete condenser (e.g., a water cooled block) aids heat transport. The evaporating surface is intended to engage/contact a heat source to absorb the heat of the heat source, thereby heating and evaporating the working fluid in the vapor chamber. When the vapor is brought into contact with a "cold" surface (i.e., the condensing surface), the vapor condenses into liquid to release the latent heat of the working fluid. With the phase change between vapor and liquid of the working fluid, the heat of the heat source can be conducted to the condensing surface.

Heat pipes are generally inexpensive, reliable, and long lived, thus they are in wide use. Moreover, they provide effective heat removal over long distances and can be effective for applications characterized by high g-forces, shock, vibration, and freeze/thaw. Further still, their use enables smaller and more compact arrangements of electronics as is characteristic of hand held devices and avionics. Present technical efforts include those directed to flexible and conformal thermal grounds planes, more particularly, to ease of manufacture and reliability thereof.

Rosenfeld et al. (U.S. Pat. No. 6,446,706), and later Kim et al. (U.S. Pub. No. 2008/0210407 A1) citing same, both incorporated herein by reference in their entireties, generally express concerns relating to the exacerbated tensions of maintaining uniform lamina contacts in furtherance of predictable, repeatable and reliable heat transfer, and establishing suitable capillary force/wicking, to facilitate phase change of a working fluid, in the context of thin, flat panel type heat transfer devices. As to the former, each outer heat pipe wall of the purportedly especially flexible heat pipe is characterized by a plurality of lamina, among others, two/dual metal foil layers intended to function as barriers to material ingress/egress. As to the later, in furtherance of an aim of ensuring high thermal conductivity at a low cost, a panel type heat transfer device characterized by one or more aggregated hydrophillic fiber wick structures and a directional coolant passage is provided. Be that as it may, manufacturing ease for such devices has remained elusive, with reliability wanting.

Issues of low production yield, low vapor-liquid circulation efficiency, and poor internal supporting strength remain as indicated by Yang et al. (U.S. Pat. No. 8,997,839) and Yang (U.S. Pat. No. 9,021,698), each incorporated herein by reference in their entireties. The former teaching provides a thin sheet element characterized by intersectingly extending sections which define element openings, and bosses fixedly located in select openings thereof, the bosses and thin sheet member being disposed in a receiving space of a pipe body at the same time. The latter teaching provides a flat plate heat pipe characterized by only two soldered sealing joints (i.e., the pipe is flattened and the two free ends sealed) and a sintered supporting layer which functions to avoid plate deformation while apertures thereof permit passage of a phase-change media therethrough and there across.

Beyond the aforementioned developments and perceived shortcomings, capillary wick structures have deservingly been a focal point for thermal ground plane advancement. With reliance upon material science advances, improved thermal conductivity and coefficient of thermal expansion matching have been generally realized in and for capillary wick structures, with working in this area ongoing. Conventional metal powder based wicking structures (e.g., sintered copper) have generally been succeeded, for instance and without limitation, by those characterized by copper foam, copper micro and nano structures (and hybrids thereof), with and without a hydrophilic coating (e.g., an atomic layer deposited (ALD) film), diamond-copper composites, titanium and titania micro and nano structures, and carbon micro and nano structures.

Be that as it may, it is well known and appreciated that a hermetic seal of the thermal ground plane structure is considered critical. Generally known and practiced techniques or methods include, for example, solder bonding, polymer bonding, vacuum brazing, and electron beam welding. Moreover, in addition to a combined bonding approach such as one characterized by a fluorinated ethylene propylene (FEP), e.g., Teflon®, bond with a soldered perimeter or periphery, metal plating over an FEP bonded structure or element, as by ALD, is likewise known and practiced.

While a variety of sealing techniques are known, it is believed advantageous and desirable to overcome known shortcomings. For instance, polymer bonded device peripheries are known to be gas permeable and of suspect reliability for the long haul, with solder bonded device peripheries, by their nature, introducing a potential deleterious solder alloy and/or solder flux contamination interior of the seal (i.e., reacting with the working medium within the chamber), with such union providing/imparting no mechanical strength. Moreover, metal plating over a bonded device periphery to form or fortify the hermetic seal may not be feasible, and contrariwise, it likewise introduces a potential deleterious plating fluid contamination interior of the seal (i.e., reacting with the working medium within the chamber). Finally, while more reliable hermetic seals are achievable, the relative high cost prevents their ubiquitous application.

In addition to the heretofore cited thermal management devices, devices characterized by phase change material (PCM) are likewise known and generally valued for their energy absorption, heat storage and/or heat dissipation functionality and/or characteristics. PCMs, which are characterized by a high heat of fusion, are capable of storing and releasing large amounts of energy. Heat is absorbed or released when the material changes from solid to liquid and vice versa, with PCMs thusly classified as latent heat storage (LHS) units. While latent heat storage can be achieved through solid→liquid, solid→gas and liquid→gas phase changes, only solid→liquid and liquid→solid phase changes are practical for PCMs.

With numerous electronic devices, especially phones, hand helds, tablets, etc. operating at fluctuating power levels (i.e., periods of low and high power demands), the attenuation or buffering of variable thermal demands/loads via a heat sink (e.g., a PCM heat sink) is believed desirable and advantageous owing to a promise of improved electronic device performance and reliability.

That said, PCM have their limitations and/or shortcomings, most notable, heat distribution. While known PCMs have undergone adaptation to improve or enhance energy absorption, heat storage and/or heat dissipation characteristics for passive thermal control (see e.g., Outlast® LHS heat spreaders from Outlast Technologies LLC, Colorado, USA), efforts in this area nonetheless continue.

In light of the foregoing, there thus remains a need to provided a low cost, long lived thermal ground plane characterized by a highly reliable hermetic seal. Moreover, there thus remains a need to provided a low cost, long lived thermal ground plane having structural chamber members formable within a device periphery characterized by a highly reliable unions of select opposing chamber portions. Further still, it is believed desirable and advantageous to provide an elegant, low cost process for fabricating high reliability thermal ground planes. Yet further and finally, it is believed desirable and advantageous to improve PCM performance via an adaptation wherein an improved thermal ground plane is operatively combined with a PCM, adapted or otherwise.

SUMMARY OF THE INVENTION

A thermal ground plane is generally provided. The device includes a casing characterized by a first casing portion and a second casing portion, the first casing portion united with the second case portion via an ultrasonic weldment so as to delimit a hermetically sealed casing chamber characterized by evaporating and condensing portions, segments or sections. A phase-change media resides within the casing chamber, along with a wicking structure and a spacing or vapor element. The wicking structure, which among other things aids phase-change of the phase change media, is adjacent the first casing portion of the casing. The spacing element, which among other things likewise aids phase-change of the phase change media, is intermediate the wicking structure and the second casing portion.

Advantageously, as circumstances warrant, opposing casing portions are selectively united via an ultrasonic weldment in furtherance of forming tensioning elements within the casing chamber. The tensioning elements comprise at least portions of each of the first casing portion and the second casing portion, however, the tensioning elements may alternately comprise portions of each of the first casing portion, the wicking structure, the spacing element, and the second casing portion.

Further still, the subject thermal ground plane may further include a metal/metal alloy coating, namely, a metal coating overlaying the ultrasonic weldments of the device. Advantageously, the metal coating may be a soldered coating or a brazed coating.

Yet further, a thermal ground plane precursor is provided. The precursor is generally characterized by a working envelope having a first envelope portion and a second envelope portion. The first envelope portion is united with the second envelope portion via a primary ultrasonic weldment so as to delimit an envelope chamber. The first envelope portion and the second envelope portion are further united via a secondary ultrasonic weldment partially traversing the working envelope so as to substantially delimit first and second envelope compartments, the first envelope compartment characterized by a phase-change media filling port. A phase-change media resides within the working envelope. A wicking structure resides within the second envelope compartment adjacent a portion of the first envelope element, and a spacing element likewise resides within the second envelope compartment intermediate the wicking structure and a portion of the second envelope portion. Subsequent to introducing the phase change media to the working envelope, the secondary ultrasonic weldment is adapted so as to fully traverse and bifurcate the working envelope and thereby delimit a casing, the casing being commensurate with the first envelope compartment, the first envelope compartment thereafter removable in furtherance of delimiting a thermal ground plane characterized by a chargeportless casing.

Finally, a thermal energy storage assembly characterized by a housing having first and second chambers characterized by first (e.g., solid/liquid) and second (e.g., liquid/vapor) phase-change media, respectively, is generally provided. The housing includes first and second housing portions and a partition structure, the housing portions and the partition structure united about their peripheries via an ultrasonic weldment so as to delimit the housing chambers. The second housing chamber includes condenser and evaporator chamber portions or segments. The partition structure and the second housing portion are selectively united via ultrasonic weldment in furtherance of forming tensioning elements within same. A wicking structure and spacing element reside within the second housing chamber to aid phase-change of the second phase change media. More specific features and advantages obtained in view of those features will become apparent with reference to the drawing figures and DETAILED DESCRIPTION OF THE INVENTION.

BRIEF DESCRIPTION OF THE DRAWINGS

The assembly, subassemblies, apparatus, structures and/or elements disclosed directly or implicitly herein may be embodied in other specific forms without departing from the spirit or general characteristics thereof, some of which forms have been indicated. Thus, the features described and depicted herein/herewith are to be considered in all respects illustrative and not restrictive. Moreover, in-as-much-as structures have been assigned select unique reference characters through the subsequent written description, and which correlate to at least one drawing of the instant drawings, the identification of all depicted structures in any given drawing via the inclusion of reference characters has been superceded for the sake of clarity. The drawings are described as follows.

DETAILED DESCRIPTION OF THE INVENTION

As a preliminary matter, the instant disclosure generally sets forth illustrative, non-limiting thermal ground planes characterized by casing having a hermetic ultrasonic welded seal. Moreover, internal structural members or elements (e.g., tension members or "posts") of or for such device are delimited by a select ultrasonic welded unions of device portions. Further still, in addition to such devices, a precursor device is disclosed, with attendant methods of fabricating the contemplated device/device precursor likewise disclosed. Finally, an especially advantageous, non-limiting thermal energy storage assembly characterized by the contemplated thermal ground plane assembly is disclosed.

Figure 5:
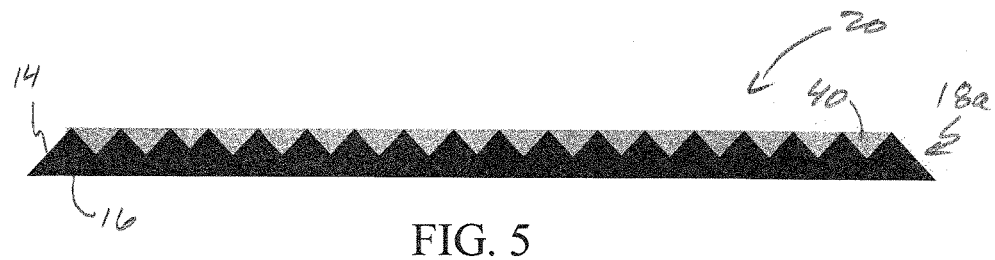
FIG. 5 is a sectional view about line 5-5' of the thermal ground plane of FIG. 1 schematically indicating ultrasonically united casing portions, namely, a hermetically sealed and fortified chamber periphery.
Figure 6:
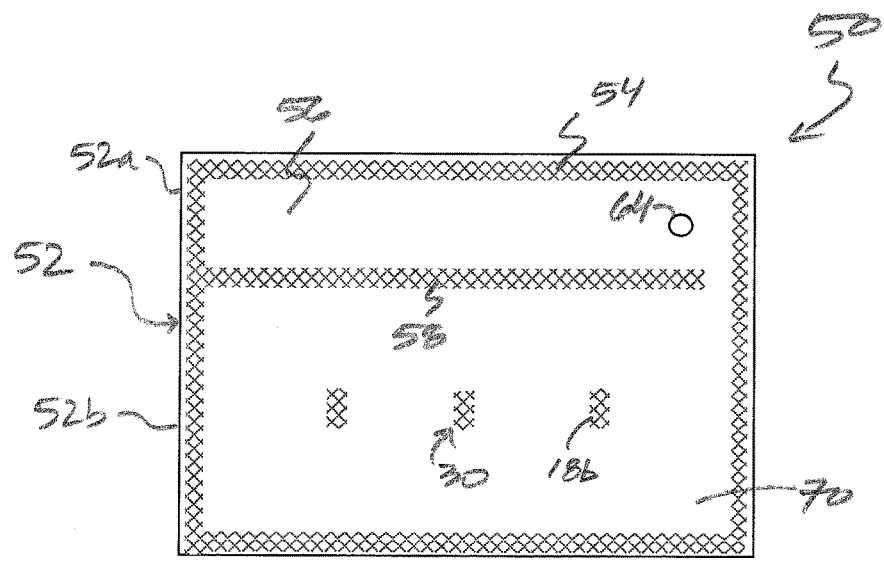
FIG. 6 depicts, schematic plan, a representative, non-limiting precursor of the thermal ground plane of FIG. 1.
Figure 7:
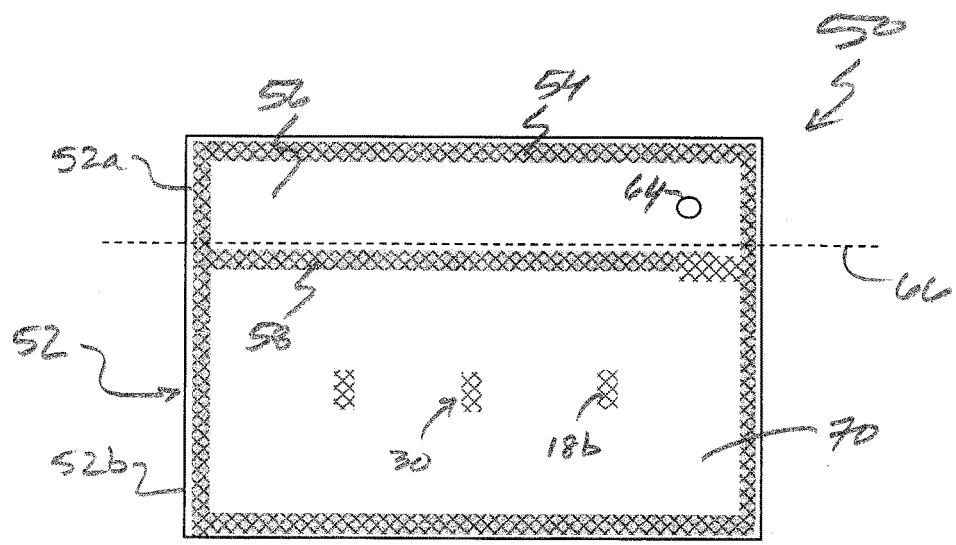
FIG. 7 depicts, schematic plan, adaptations relative to the FIG. 6 precursor; and, FIG. 8 depicts, sectional view as FIG. 2, a preferred non-limiting thermal energy storage assembly characterized by an operative combination of the thermal ground plane of FIG. 1 with a preferred non-limiting PCM device/assembly.

By way of overview, a thermal ground plane, plan view, is schematically illustrated in FIG. 1, and again as part of a thermal ground plane assembly (FIG. 8), with a thermal ground plane precursor and adaptation thereof depicted in FIGS. 6 & 7 respectively. First, second, third and fourth representative, non-limiting sections of the thermal ground plane of FIG. 1 are provided in FIGS. 2-5; the first emphasizing a device casing and elements thereof; the second emphasizing an advantageous tensioning element characterized by direct union of opposed casing portions; the third emphasizing a further advantageous, alternate tensioning element characterized by a union of opposed device portions; and, the fourth emphasizing an advantageous peripheral union of opposed device casing members.

While the balance of the instant disclosure speaks to flexible thermal ground planes (FTGPs), and assemblies characterized by same, Applicant's subject matter is not intended to be so limited. Moreover, while advantageous and even preferred features are disclosed, in addition to particulars for the contemplated thermal ground plane and its precursor (i.e., specifications for the device and its components), it is to be understood that such disclosure is illustrative and not intending to be limiting, with departures as to same contemplated.

Figure 1:
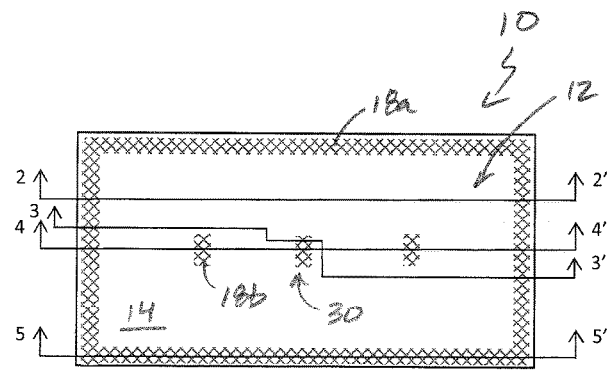
FIG. 1 depicts, schematic plan, a representative, non-limiting thermal ground plane characterized by ultrasonically welded unions delimiting both a hermetically sealed device periphery and internal tension members.
Figure 2:
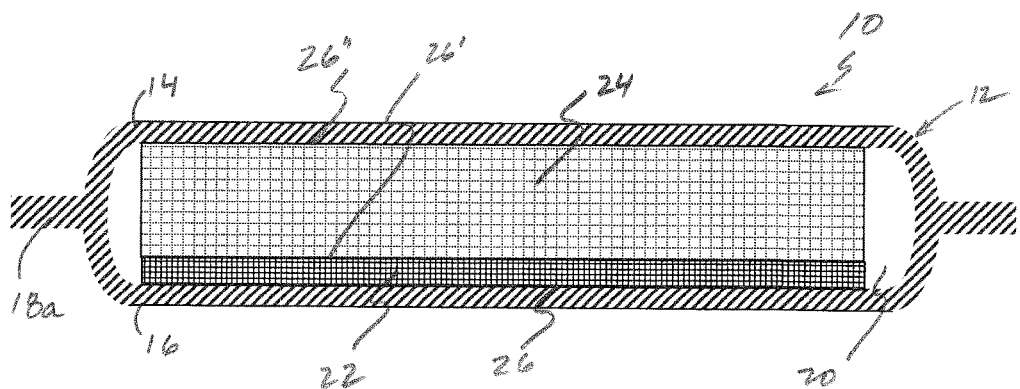
FIG. 2 is a sectional view about line 2-2' of the thermal ground plane of FIG. 1.

With initial reference to FIGS. 1 & 2, there is generally shown, in two views, a thermal ground plane 10. The device generally includes a casing 12 characterized by a first casing portion 14 and a second casing portion 16 (FIG. 2), the first casing portion united with the second case portion via an ultrasonic weldment 18, i.e., a peripheral ultrasonic weldment 18a, so as to delimit a hermetically sealed casing chamber 20 (FIG. 2), a phase-change media, a/k/a, a working fluid, generally residing therein. The device further and generally includes a wicking structure 22 and a spacing or vapor element 24, each of which resides within casing chamber 20 (FIG. 2). Wicking structure 22 is adjacent second casing portion 16 of casing 12, more particularly, an interior surface of the second casing portion (i.e., a casing evaporator segment, portion, or region). More particularly, and advantageously, a bonded interface for, between and among the wicking structure and the second casing portion is provided, for example and without limitation, via a diffusion bonded interface 26. Spacing element 24 is intermediate wicking structure 22 and first casing portion 14, more particularly, an interior surface of the first casing portion (i.e., a casing condenser segment, portion, or region). Advantageously, but hardly exclusively, diffusion bonding of all lamina of the casing, i.e., each lamina-lamina interface, is contemplated, e.g., a diffusion bonded interface 26' is contemplated for, between and among wick structure 22 and spacer element 24, and a diffusion bonded interface 26" is contemplated for, between and among spacer element 24 and first casing portion 14, with both thermal and mechanical advantage realized. As to the latter, via a structurally unified chamber interior via the bonded lamina interfaces, this approach is believed a functional alternative to the tensioning elements contemplated in select applications, however, a device characterized by both features is believed desirable.

Figure 3:
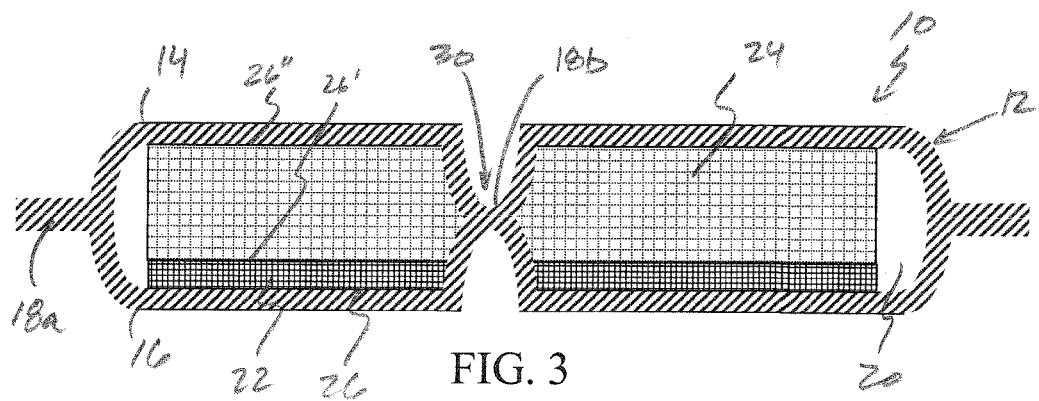
FIG. 3 is a sectional view about line 3-3' of the thermal ground plane of FIG. 1 indicating a tension member section.
Figure 4:
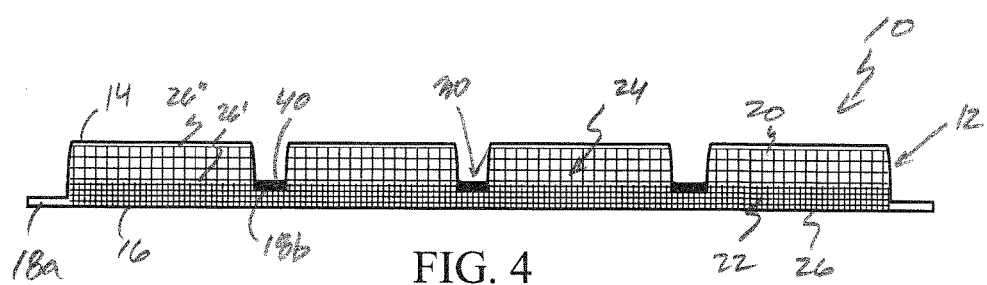
FIG. 4 is an alternate sectional view, about line 4-4', of the thermal ground plane of FIG. 1 schematically indicating an alternate tension member section.

With reference now to FIGS. 1, 3 & 4, tension elements 30 are advantageously and variably contemplated as shown. Notionally, such elements function to maintain the structural integrity of the casing, more particularly, the structural integrity of the casing chamber, the location and number of such elements being part-and-parcel of a given application and its aims. Advantageously, opposing casing portions are selectively united via an ultrasonic weldment, i.e., an interior ultrasonic weldment 18b, in furtherance of forming tensioning elements 30 within casing chamber 20.

In connection to FIG. 3, opposing casing portions 14, 16 are selectively united via ultrasonic weldment 18b in furtherance of forming tensioning elements 30 within casing chamber 20, each tensioning element solely characterized by portions of each of first casing portion 14 and second casing portion 16. In furtherance of manufacturing ease, more particularly, registration and retention of device lamina during operations in furtherance of chamber formation, internal lamina may be adapted to include a select arrangement or configuration of apertures within their peripheries, these locals being subject of interior weldment operations yielding the tensioning elements depicted.

In connection to FIG. 4, and in contradistinction to FIG. 3, opposing casing portions may be selectively united via an ultrasonic weldment 18b in furtherance of forming tensioning elements 30 within casing chamber 20, each tensioning element characterized by portions of each of first casing portion 14, wicking structure 22, spacing element 24, and second casing portion 16. Via a single step, all weldments may be made, and in a less than atmospheric environment, the weldments possess sufficient strength to maintain casing integrity, and critically sufficient cooperative engagement of the casing elements, e.g., the wicking structure and its adjacent casing portion, in furtherance of effective heat transfer.

The weldment is ultrasonically applied. Via a localized application of high-frequency ultrasonic acoustic vibrations to a workpiece, e.g., overlaying casing portions or opposed chamber portions, a solid-state weldment is formed or formable. In-as-much as any of a seam weld, an overlapping spot weld, and/or an overlapping line weld is contemplated and believed suitable for the formation of either and/or both of a hermetic casing seal and tension elements, a seam weld is understood to be especially advantageous.

As is best appreciated with reference to either or both of FIGS. 4 & 5, an especially advantageous embodiment of the contemplated thermal ground plane further includes a metal/metal alloy coating 40, more particularly, a coating of same upon ultrasonic weldments 18 of the device. Owing to the weld process, localized deformation of casing material may cause a thinning of the material thickness. Moreover, the geometry of the interior weld interface creates stress risers. Application of the metal/metal alloy coating over the weldments strengthens and rigidizes the areas to reduce applied stresses.

The casing portions of the device casing comprise impermeable lamina. Elemental metal, namely, copper or aluminum, and more particularly, foils thereof are preferred but by no means intended to be limiting. Copper foil is especially advantageous owing to its compatibility with water, a common and desirable phase change media or working fluid. Generally, the impermeable lamina is within a thickness range of about 1-10 mils, with a 3-5 mil thickness advantageous for copper or aluminum foils owing to a good mix of strength versus weight. In applications where the impermeable lamina would/could create an electrical short in a system where the sought after heat management is to be conducted, the otherwise advantageous lamina may be readily adapted so as to selectively include a dielectric. While, for the sake of optimal heat transfer/conductance, evaporator and condenser portions of the thermal ground plane are to be free of the generally insulative dielectric, applications may warrant a departure from less than ideal circumstances. Conventional dielectric films, conventionally applied to the impermeable lamina are contemplated, with adhesively applied polyimide believed advantageous.

The wicking structure preferably but not necessarily comprises a layered wicking structure. Conventional wicking structures are generally contemplated, e.g., and without limitation, a micro-mesh, a felt, or a sintered material, with copper preferred owing to its ubiquitous acceptance as a neutral element, i.e., it does not contribute to the formation of deleterious non-condensable gases. As to wicking structure thickness, a balancing of performance aims are commonly in play, e.g., thermal objectives versus physical constraints. Cooperative engagement of the wicking structure with the evaporator the device is believed advantageous, a diffusion bonded interface for, between and among the structure and its adjacent casing portion is preferred.

The vapor spacing element may suitably take a variety of forms and comprise one of many well know materials. Be that as it may, a metal mesh, e.g., copper mesh, is preferred owing to its simplicity and its general inertness and compatibility with diffusion bonding in a copper to copper context. In connection to a stack-up for removing heat from a 25 watt heat generating source such as an electronic component, the following working example is provided: 2 mil polyimide, 1 mil acrylic adhesive, 4 mil copper foil, 16 mesh copper with 10 mil diameter wire, three layers of 200 mesh copper with 2.5 mil wire diameter, 4 mil copper foil, 1 mil acrylic adhesive, 2 mil polyimide. Representative non-limiting device applications include component cooling in connection to circuit boards or other high powered electronic arrays, or battery pack cooling/heat spreading.

Referring now to FIGS. 6 & 7, an advantageous thermal ground plane precursor 50 is provided. As will be described, and appreciated in connection thereto, the fabrication approach for the contemplated thermal ground plane results in a "chargeportless" casing, i.e., the hermetic ultrasonic periphery weldment delimiting the casing chamber of the device is not adulterated via post manufacture/post manufacture working fluid charging. Needless to say, such approach greatly aids performance reliability and a long lived performance reliability.

The precursor, as shown, is generally characterized by a working envelope having a first envelope portion 56 and a second envelope portion 70. The first envelope portion is united with the second envelope portion via a primary ultrasonic weldment 54 so as to delimit an envelope chamber. The first envelope portion and the second envelope portion are further united via a secondary ultrasonic weldment 58 partially traversing the working envelope so as to substantially delimit first and second envelope compartments, the first envelope compartment characterized by a phase-change media filling port 64 (FIG. 6), with a phase-change media residing within the working envelope.

A wicking structure resides within the second envelope compartment adjacent a portion of the first envelope element, and a spacing element likewise resides within the second envelope compartment intermediate the wicking structure and a portion of the second envelope portion (see e.g., FIG. 2 as to particulars). Subsequent to introducing the phase change media to the working envelope, secondary ultrasonic weldment 58 is adapted so as to fully traverse and bifurcate the working envelope and thereby delimit a casing (FIG. 7), the casing being commensurate with the first envelope compartment. Once so adapted, the first envelope compartment is thereafter removed, as generally indicated via the broken line through the first envelope adjacent the formed casing chamber, in furtherance of delimiting a thermal ground plane characterized by a chargeportless casing.

Benefits accruing from hermetic seals or device unions characterized by ultrasonic weldments or the like are believed numerous. For instance, and without limitation, such approach enables significantly lower cost manufacture of FTGP than vacuum brazing or electron beam welding; introduces little or no non-copper surfaces to the interior chamber of the FTGP (NB: it is a common problem for the long term reliability of heat pipes and vapor chambers for non-standard materials to react with the working medium overtime and form non-condensable gases inside the device, thus negatively impacting its heat transfer performance; copper is the standard for water based heat pipes); provides structural reinforcements for low atmospheric operating environments; enables an efficient means to seal the charging port while actively interfaced with charging apparatus, again with less or no exposure non-copper surfaces; provides a means to charge the FTGP without leaving any charging port appendage(s) on the final product, and thus, amongst other things, reducing the chance of accidental damage and resulting device failure; and, it makes the benefits of a FTGP economically accessible to a wide range of applications.

In addition to the structures depicted and described, several further related items are noteworthy. More particularly, a copper to copper hermetical sealing process for FTGPs, the formation or establishment of copper to copper tension elements or structures, and, a metal alloy coating that enhances or fortifies the durability of the formed union or joint.

With regard to the copper to copper hermetic sealing process, preferably, but not necessarily, the process is characterized by a seam weld. Alternatively, overlapping spot or line ultrasonic welds are contemplated. The weld provides both a hermetic seal and necessary mechanical strength. Moreover, a large (i.e., >12"×12") device geometry is enabled via the subject low cost approach in contradistinction to processes currently and commonly used to hermetically seal small diameter tubes, and for hermetically sealing electronic device packages <0.5" in length/width.

With regard to the formation of copper to copper tension members, multiple layers/lamina are contemplated for union in a single step, e.g., all copper materials, through exterior foils and interior wicking and vapor spacing materials. The resulting device provides necessary strength to hold the device/envelope together in less than atmospheric environment.

With regard to the metal alloy coating for enhanced weld joint durability, it is generally understood that the weld process causes localized deformation of copper that can reduce the foil thickness. Post weld solder/braze process strengths these areas. Moreover, with the geometry of the interior weld interface creating stress risers, the post weld solder/braze process rigidizes these areas so as to spread out the stress.

Figure 8:
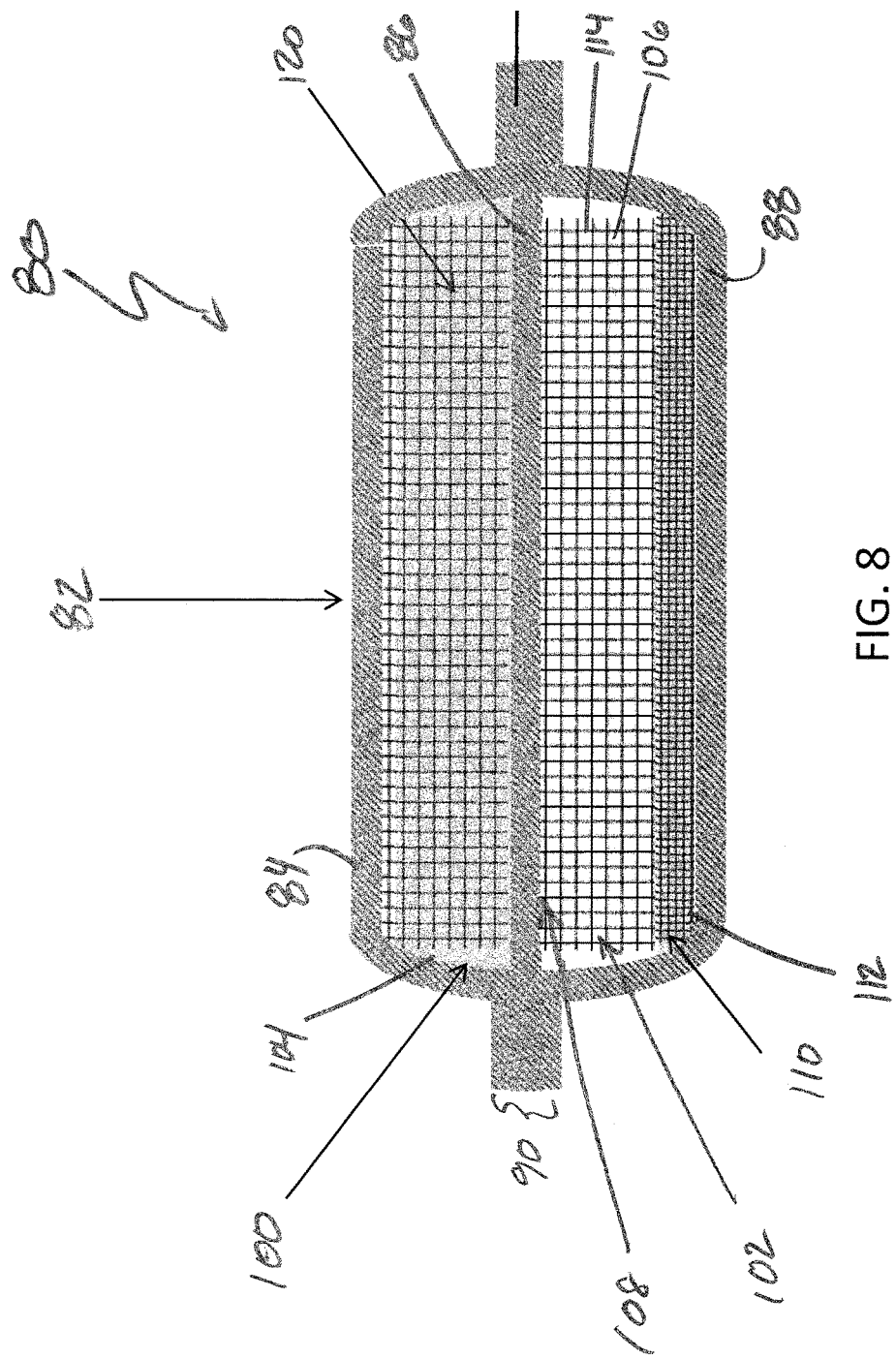

With reference now to FIG. 8, there is generally depicted, in sectional view, an advantageous, non-limiting thermal energy storage assembly characterized by an operative union of the contemplated thermal ground plane 10 and a phase change material element/assembly. That said, it should be understood that the assembly of FIG. 8, or variants thereof, may be formed from the ground up if you will; in lieu of an integrated union of two subassemblies, a single fully integrated structure characterized by two or more chambers is likewise contemplated. Notionally, in the context of the contemplated thermal energy storage assembly, a sealed PCM layer is added to the previously described thermal ground plane, a large amount of energy being absorbed by the phase change material/media without increasing temperature above the material melting point, until the material has completed its phase change (e.g. solid to a liquid).

The assembly 80 of FIG. 8 is generally includes a housing 82 characterized by a first housing portion 84, a second housing portion 88, and a partition structure, e.g., an interior wall 86, the first housing portion, the interior wall, and the second housing portion united via an ultrasonic weldment 90, i.e., a peripheral ultrasonic weldment 90a, so as to delimit hermetically sealed housing chambers 100, 102 about/adjacent partition structure 86. Advantageously, the housing/housing related partition structure material comprises, for example, copper or aluminum, or alloys thereof. The assembly is notably characterized by first 104 and second 106 phase-change media residing with each of the first and second hermetically sealed housing chambers 100, 102, more particularly, and advantageously, solid/liquid and liquid/vapor phase-change media.

In advance of further particulars, some general observations and/or reiterations are worthwhile. Notionally, in the context of the illustrated advantageous embodiment, the first chamber functions as a heat sink and takes the form of a phase change material device/assembly, with the second chamber functioning as a heat exchanger and taking the form of a thermal ground plane. Moreover, while a from-the-ground-up fabrication is contemplated for the disclosed assembly, the subassemblies may be suitably united and/or adapted and united to produce an advantageous thermal energy storage assembly.

As should be appreciated via comparison of FIG. 8 with FIG. 2, second housing chamber 102 functions as a thermal ground plane, and advantageously, but not exclusively, is characterized by the functional and/or structural attributes of the heretofore described, shown, or otherwise disclosed thermal ground plane. For example, and without limitation, the second housing chamber includes condenser and evaporator chamber portions, segments or sections. In connection to the depicted FIG. 8 assembly, the condenser segment includes the partition structure, however, alternate thermal ground plane configurations are contemplated, suitable, and even advantage. The partition structure 86 and second housing portion 102 are selectively united via ultrasonic weldment 90 in furtherance of forming tensioning elements within same (not shown, but see FIG. 3 or FIG. 4). A wicking structure 112 and spacing element 114 reside within second housing chamber 102 to aid phase-change of the second phase change media.

First housing chamber 100 contains first phase-change media 104. Advantageously, but not exclusively, the media comprises an organic compound, more particularly, a paraffin (e.g., $C_{36}H_{74}$, $C_{32}H_{66}$, and $C_{30}H_{62}$), such compounds offering significant life, good chemical compatibility with metals, large latent heat, and a wide operating range. That said, form fits function, with phase-change media selection subject to/of well know factors/parameters, for example, melt temperature/range. Advantageously, owing to relationships for, between, and among assembly elements/components, the first phase-change media can have an otherwise undesirable low thermal conductivity and low viscosity when present in a liquid state.

First housing chamber 100 advantageously includes a thermally conductive element or structure 120, for example, one or more copper screens or punched-and-formed copper foil layers (i.e., a heat spreading, thermally conductive weave). Functionally, the structure aids in the transfer of heat from the second housing chamber into the bulk of the first phase-change media, provided structural support/integrity for its housing portion (i.e., first housing portion), and aids in the transfer of heat out of the first phase-change media to the outside surface of the first housing portion. Advantageously, but not necessarily, the thermally conductive element may be as per the spacing or vapor element of the second housing chamber.

Since the structures of the assemblies, subassemblies, and/or mechanisms disclosed herein may be embodied in other specific forms without departing from the spirit or general characteristics thereof, some of which forms have been indicated, the embodiments described and depicted herein/with are to be considered in all respects illustrative and not restrictive. Moreover, while nominal processing has been described and detailed, and to some degree alternate work pieces and systems, assemblies, etc. with regard thereto referenced, contemplated processes are not so limited. Accordingly, the scope of the subject invention is as defined in the language of the appended claims, and includes not insubstantial equivalents thereto.

That which is claimed:

1. A thermal energy storage assembly comprising:
   a. a housing characterized by a first housing portion, a second housing portion, and a partition structure, said housing portions and said partition structure united about their peripheries via an ultrasonic weldment so as to delimit hermetically sealed first and second housing chambers about said partition structure, said second housing chamber characterized by condenser and evaporator chamber portions, said partition structure and said second housing portion selectively united via ultrasonic weldment in furtherance of forming tensioning elements within said second housing chamber;

b. a first phase-change media, said first phase-change media residing within said first housing chamber;

c. a second phase-change media, said second phase-change media residing within said second housing chamber;

d. a wicking structure to aid phase-change of said second phase change media, said wicking structure residing within said second housing chamber; and, e. a spacing element to aid phase-change of said second phase change media, said spacing element residing within said second housing chamber intermediate said wicking structure and said partition structure.

2. The thermal energy storage assembly of claim 1 wherein said first housing portion comprises copper foil.

3. The thermal energy storage assembly of claim 1 wherein said first phase change media comprise a solid/liquid phase change media.

4. The thermal energy storage assembly of claim 1 wherein said first phase change media comprise an organic compound.

5. The thermal energy storage assembly of claim 1 wherein said first phase change media comprise a paraffin.

6. The thermal energy storage assembly of claim 1 wherein said second phase change media comprise a liquid/vapor phase change media.

7. The thermal energy storage assembly of claim 1 wherein said first phase change media comprise a solid/liquid phase change media, and said second phase change media comprise a liquid/vapor phase change media.

8. The thermal energy storage assembly of claim 1 further comprising a thermal conductor, said thermal conductor residing within said first housing chamber.

9. The thermal energy storage assembly of claim 1 further comprising a structural element, said structural residing within said first housing chamber.

10. The thermal energy storage assembly of claim 9 wherein said structural element comprises copper.

11. The thermal energy storage assembly of claim 9 wherein said structural element comprises copper screen.

12. The thermal energy storage assembly of claim 9 wherein said structural element comprises punched-and-formed copper foil layers.

13. The thermal energy storage assembly of claim 1 wherein said casing further comprises a metal coating, said metal coating overlaying ultrasonic weldments.

14. The thermal energy storage assembly of claim 13 wherein said metal coating is a soldered coating.

15. The thermal energy storage assembly of claim 13 wherein said metal coating is a brazed coating.

16. The thermal energy storage assembly of claim 1 wherein each tensioning element of said tensioning elements comprises portions of each of said second housing portion and said partition structure.

17. The thermal energy storage assembly of claim 1 wherein each tensioning element of said tensioning elements comprises portions of each of said second housing portion, said wicking structure, said spacing element, and said second partition structure.

18. The thermal energy storage assembly of claim 1 wherein said at least a portion of said housing selectively includes an exterior dielectric layer.

19. The thermal energy storage assembly of claim 1 wherein said ultrasonic weldment comprises a seam weld.

20. The thermal energy storage assembly of claim 1 wherein said ultrasonic weldment comprises an overlapping spot weld.

21. The thermal energy storage assembly of claim 1 wherein said ultrasonic weldment comprises an overlapping line weld.

22. The thermal energy storage assembly of claim 1 wherein said housing comprises an elemental metal.

23. The thermal energy storage assembly of claim 22 wherein said housing comprises copper.

24. The thermal energy storage assembly of claim 22 wherein said housing comprises a copper foil having a thickness within a range of about 1-10 mils.

25. The thermal energy storage assembly of claim 22 wherein said housing comprises aluminum.

26. The thermal energy storage assembly of claim 1 wherein said wicking structure comprises a layered wicking structure.

27. The thermal energy storage assembly of claim 1 wherein said wicking structure is bondingly united with said second housing portion of said housing to ensure substantially uniform thermal conduction between a heat source and said wicking structure.

28. The thermal energy storage assembly of claim 1 wherein said wicking structure comprises copper.

29. The thermal energy storage assembly of claim 1 wherein said wicking structure comprises any of a layer or layers of a copper micro-mesh, a copper felt, or a sintered copper.

30. The thermal energy storage assembly of claim 1 wherein said spacing element comprises copper.

31. The thermal energy storage assembly of claim 1 wherein said spacing element comprises a copper mesh.

32. The thermal energy storage assembly of claim 1 wherein said second phase-change media comprises water.

33. The thermal energy storage assembly of claim 1 wherein said wicking structure is bondingly united with said second housing portion of said housing, said spacing element is bondingly united with said wicking structure, and said partition structure is bondingly united with said spacing element.

* * * * *